(No Model.)
W. R. JOHNS.
COMBINED HAY TEDDER AND RAKE.
No. 255,294. Patented Mar. 21, 1882.
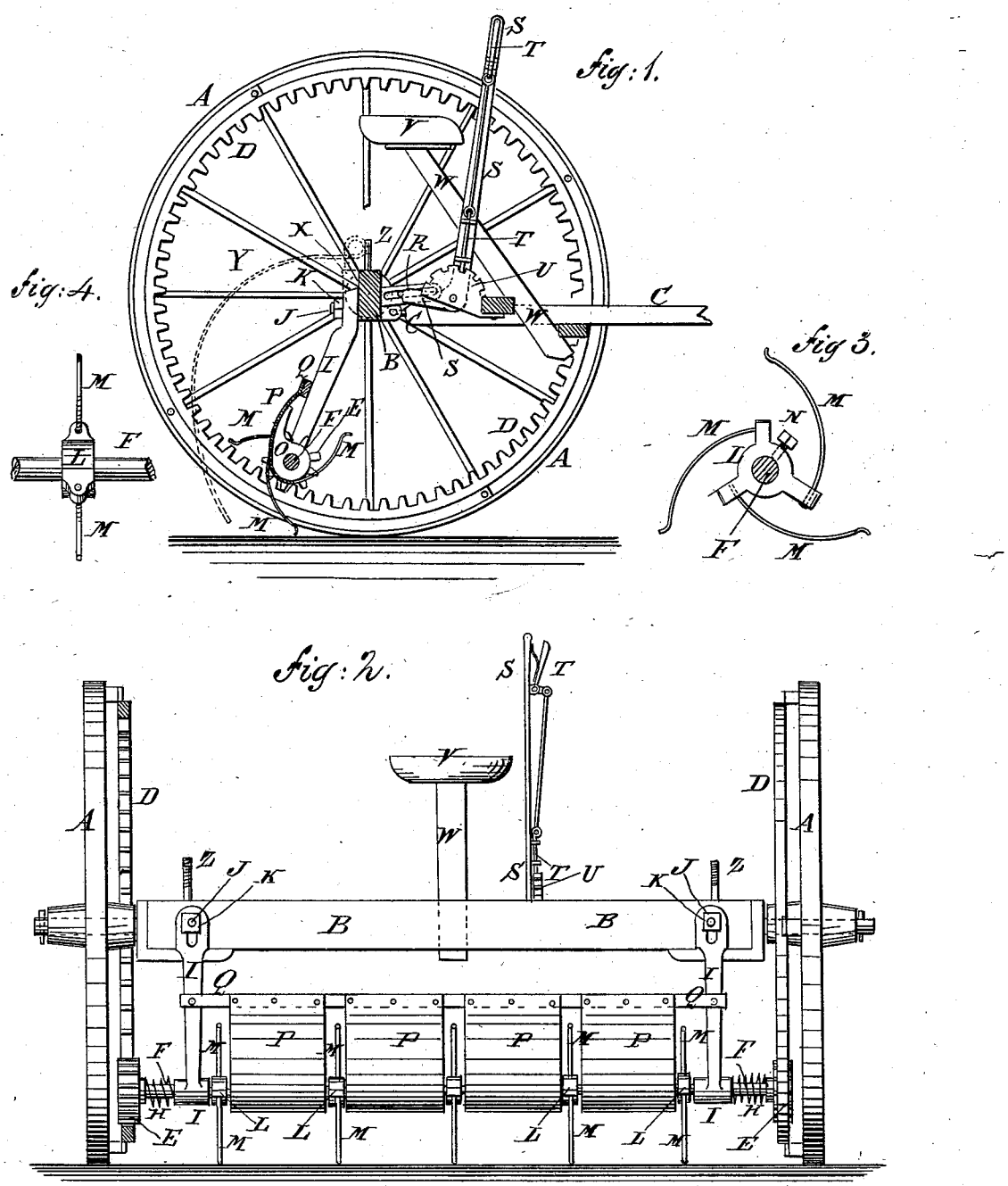
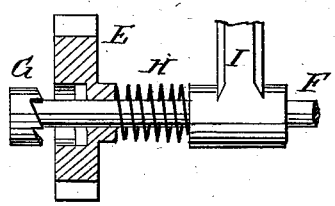
WITNESSES:
Chas. Nida
C. Sedgwick
INVENTOR:
W. R. Johns
BY
ATTORNEYS.

UNITED STATES PATENT OFFICE.

WILL R. JOHNS, OF ROCKFORD, ILLINOIS.

COMBINED HAY TEDDER AND RAKE.

SPECIFICATION forming part of Letters Patent No. 255,294, dated March 21, 1882.

Application filed November 19, 1881. (No model.)

*To all whom it may concern:*

Be it known that I, WILL R. JOHNS, of Rockford, in the county of Winnebago and State of Illinois, have invented certain new and useful Improvements in Combined Hay Tedders and Rakes, of which the following is a full, clear, and exact description.

Reference is to be had to the accompanying drawings, forming part of this specification, in which similar letters of reference indicate corresponding parts in all the figures.

Figure 1 is a sectional side elevation of my improvement. Fig. 2 is a rear elevation of the same, partly in section. Fig. 3 is a sectional elevation of the tedder-shaft, showing a hub and its teeth. Fig. 4 is a rear elevation of a portion of the tedder-shaft, showing a hub and its teeth. Fig. 5 is a rear elevation of an end part of the tedder-shaft, showing a small gear-wheel in section.

The object of this invention is to simplify the construction of hay tedders and rakes, and thus lessen the cost of their manufacture and adapt them to be drawn by a single horse.

The invention consists in the combination, with the axle and the shaft carrying the tedder-teeth, of the arms provided with bearings at their lower ends for the said shaft, and having their upper ends slotted, and the fastening bolt and nut; also, in the combination, with the drive-wheels, the internally-toothed gear-wheels, and the axle, of the tedder-shaft, the gear-wheel, the hub provided with curved teeth, and the adjustable arms; also, in the combination, with the rotary shaft, the hubs and teeth, and the supporting-arms, of scroll-guards and a cross-bar, whereby the tedder-teeth are kept from carrying hay over the shaft and becoming clogged, as will be hereinafter fully described.

A represents the drive-wheels, to the axle B of which are connected the thills C by ordinary thill-couplings or other suitable means.

To the wheels A are attached large internally-toothed gear-wheels D, into the teeth of which mesh the teeth of small gear-wheels E, placed upon the ends of the shaft F. The outer sides of the gear-wheels E are countersunk, and in the bottom of the countersinks are formed clutch-teeth to engage with the teeth of the small clutch-wheels G, attached to the ends of the shaft F, and which are made of such a size as to fit into and work in the countersinks of the gear-wheels E. With this construction the clutches are protected from dust and hay, and are thus prevented from becoming clogged.

The gear-wheels E are held out against the clutch-wheels G by spiral springs H, placed upon the shaft F, and interposed between the said gear-wheels E and the outer ends of the arms I. With this construction one of the wheels A can turn faster than the other, and the machine can be backed without turning the shaft F, while the said shaft will be turned by the forward revolution of the said wheels A. The shaft F revolves in bearings in the outer ends of the arms I, the inner ends of which rest against the rear side of the axle B, and are slotted to receive the bolts J, by which they are secured to the said axle B, so that the arms I, by loosening the nuts K of the bolts J, can be raised to take the teeth of the gear-wheels E out of mesh with the teeth of the gear-wheels D and allow the machine to be drawn forward without turning the shaft F.

Upon the shaft F, at suitable distances apart, are placed hubs L, to each of which are attached two or more teeth, M, and which are secured in place upon the shaft F by set-screws N or other suitable means. The teeth or fingers M are curved to the rearward, as shown in Figs. 1 and 3, which form gives the said teeth sufficient spring and avoids the necessity of making the said teeth with a coil.

Upon the shaft F, between the hubs L, are placed wooden blocks O, within which the said shaft F revolves, and which are made with a curved or scroll-shaped flange upon one side.

To the blocks O are attached the lower edges of plates P, of sheet metal, which fit upon the convex side of the flanged or scroll blocks O and have their upper edges attached to the bar Q. The ends of the bar Q are attached to the middle parts of the arms I. With this construction, as the machine is drawn forward the teeth M raise and turn the hay, and any hay that may be carried up by the teeth M is removed by the plates P and slides down the said plates to the ground, so that the teeth M cannot become clogged with hay. With this construction the hay will be raised and turned and left in a loose condition, so that it will be readily dried and cured.

To the forward side of the middle part of the axle B is rigidly attached an arm, R, which is slotted longitudinally to receive a pin formed upon or attached to the end of the short arm of a bent or angle lever, S. The lever S is pivoted at its angle to the thills C or to a support attached to the said thills, and its long arm projects into such a position that it can be readily reached and operated by the driver from his seat to turn the axle B and raise and lower the shaft F and its attachments. The lever S is held in any position into which it may be adjusted by a spring lever pawl, T, connected with it, and which engages with the teeth of a catch-plate, U, attached to the thills C or other suitable support.

The driver's seat V is attached to the upper end of a standard, W, the lower part of which is attached to the cross-bars of the thills C.

When the machine is to be used as a rake the arms I and their attachments are detached from the bolts J, and the cross bar or head X of the rake is placed upon the said bolts and secured in place by the nuts K, the rake-teeth Y being made of such a length and shape as to reach to, or nearly to, the ground and have their lower ends in proper position to collect hay. The rake can be carried from place to place by placing its cross-bar X upon the upwardly-projecting pins or bolts Z, attached to the upper side of the end parts of the axle B.

The rake-teeth Y are raised from the ground to dump the collected hay by operating the lever S, which lever also holds the said rake-teeth down to their work.

Having thus fully described my invention, I claim as new and desire to secure by Letters Patent—

1. In a hay-tedder, the combination, with the axle B and the shaft F, carrying the tedder-teeth, of the arms I, provided with bearings at their lower ends for the said shaft, and having their upper ends slotted, and the bolt and nut J K, substantially as and for the purpose set forth.

2. In a hay-tedder, the combination, with the drive-wheels A, the cog-wheels D, and the axle B, of the shaft F, the gear-wheels E, the hubs L, provided with the teeth M and the arms I, adjustably secured to the axle, substantially as and for the purpose set forth.

3. In a hay-tedder, the combination, with the rotary shaft F, the hubs and teeth L M, and the arms I, of the scroll-guards O P and the cross-bar Q, substantially as herein shown and described, whereby the tedder-teeth are kept from carrying hay over the shaft and becoming clogged, as set forth.

WILL R. JOHNS.

Witnesses:
RICHARD JOHNS,
MARTIN ROWE.